(12) United States Patent
Hanna et al.

(10) Patent No.: US 6,252,880 B1
(45) Date of Patent: Jun. 26, 2001

(54) APPARATUS AND METHOD FOR SELECTIVELY SUPPLYING A DATA PACKET TO A SELECTED NETWORK NODE IN A BUFFERED DISTRIBUTOR

(75) Inventors: Ganatios Y. Hanna, Irvine; Mohan V. Kalkunte, Sunnyvale, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/966,747

(22) Filed: Nov. 10, 1997

(51) Int. Cl.[7] .................................................. H04L 12/28
(52) U.S. Cl. .............................................................. 370/425
(58) Field of Search .................................... 370/389, 398, 370/401–404, 428, 429, 408, 396, 400, 412, 413, 419, 421, 422, 425, 426

(56) References Cited

U.S. PATENT DOCUMENTS

| | | | |
|---|---|---|---|
| 4,866,702 | * 9/1989 | Shimizu et al. | 370/438 |
| 5,058,109 | * 10/1991 | Goldberg et al. | 370/401 |
| 5,309,437 | * 5/1994 | Perlman et al. | 370/401 |
| 5,436,617 | * 7/1995 | Adams et al. | 370/254 |
| 5,594,702 | * 1/1997 | Wakeman et al. | 365/230.05 |
| 5,740,375 | * 4/1998 | Dunne et al. | 709/238 |
| 5,764,895 | * 6/1998 | Chung | 395/200.8 |
| 5,771,235 | * 6/1998 | Tang et al. | 370/446 |
| 5,787,253 | * 7/1998 | McCreery et al. | 395/200.61 |
| 5,796,738 | * 8/1998 | Scott et al. | 370/401 |
| 5,812,792 | * 9/1998 | Haddock et al. | 709/249 |
| 5,859,846 | * 1/1999 | Kim et al. | 370/389 |
| 5,875,210 | * 2/1999 | Brief et al. | 375/211 |
| 5,883,894 | * 3/1999 | Patel et al. | 370/438 |
| 5,905,870 | * 5/1999 | Mangin et al. | 709/234 |
| 6,002,675 | * 12/1999 | Ben-Michael et al. | 370/315 |
| 6,031,821 | * 2/2000 | Kalkunte et al. | 370/235 |

OTHER PUBLICATIONS

Broadband, Steve; A Bridge Too Far; Bridge Networks, Personal Computer Magazine; pp. 269–277, 1996.*
Lewis, John M., Bandwidth Utilzation of a Large Local Area Network, IEEE communications magazine Feb. 1989 pp. 25–33.*
B. Daines, "Gigabit Buffered Distributor Proposal," IEEE802.3z Task Force Meeting, Vancouver, Nov. 1996.

* cited by examiner

*Primary Examiner*—Melvin Marcelo
*Assistant Examiner*—Jasper Kwoh

(57) ABSTRACT

A buffered distributor having a plurality of network ports serving respective network nodes includes a distribution core having a filter for selectively supplying a data packet to a selected network port based on the destination address of the received data packet relative to the network address of the network node corresponding to the selected network port. The buffered distributor distributes the received data packet to all network ports. Each network port includes a transmit buffer that loads the distributed data packet in response to an enable signal from the distribution core. The filter logic outputs a filter signal that prevents generation of the enable signal for a selected transmit buffer if a review of the destination address indicates the distributed data packet is not relevant to the corresponding network port. The buffered distributor is particularly effective in a workgroup environment, where the buffered distributor will serve a plurality of clients, a server, and a predetermined network node such as a router or a switch, where it is desirable to limit client-server traffic from being unnecessarily transmitted to the switch or the router.

18 Claims, 2 Drawing Sheets

APPARATUS AND METHOD FOR SELECTIVELY SUPPLYING A DATA PACKET TO A SELECTED NETWORK NODE IN A BUFFERED DISTRIBUTOR

BACKGROUND OF THE INVENTION

1. Technical Field

The present invention relates to buffered distributors, more specifically to full-duplex buffered distributors sending data packets between network nodes.

2. Background Art

Repeaters are typically used as an interconnection between network nodes, for example network stations serving as data terminal equipment (DTE) on different network media. Repeaters provide the advantage of extending the physical distance between network nodes by receiving the data packet from one network media, reconditioning the physical signal, and outputting the data packet to a second network media.

Certain vendors have proposed a buffered distributor, also referred to as a full-duplex repeater, as a viable alternative to a half-duplex repeater. Specifically, the buffered distributor includes a number of network ports, where each network port is configured for full-duplex communication with a corresponding network node. Each network port includes a receive first in-first out (FIFO) buffer, and a transmit FIFO buffer. The buffered distributor also includes a repeater core, also referred to as a "backplane," that distributes a data packet stored in one of the receive FIFO buffers to the other network ports. Specifically, a receive FIFO buffer outputs a stored data packet to the other network ports by gaining access to the backplane. Access to the backplane may be implemented either by CSMA/CD logic, where the Receive FIFO buffers contend for access to the backplane using a zero topology collision domain (using CSMA/CD logic), or another arbitration scheme such as round-robin.

The above-described buffered distributor also includes a flow control mechanism according to IEEE 802.3x, where the repeater core will generate a PAUSE frame when a predefined threshold is reached in the one of the receive FIFO buffers. Specifically, a network port having a detected congestion condition (i.e., stored data exceeding the predefined threshold) in its corresponding receive FIFO buffer will output a MAC control frame carrying a predetermined PAUSE interval into the corresponding transmit FIFO buffer. The network node in communication with that network port, having received the MAC control frame, will suspend transmission for the predetermined PAUSE interval, enabling the repeater core to remove packet data from the congested receive FIFO buffer.

A problem encountered in use of a buffered distributor in a workgroup environment is that one or more servers may be connected to the buffered distributor along with several clients. In addition, one of the ports may be connected to a router or switch. In such an environment, the router port (or switch port) will see all the frames that are communicated between the client and the server. Hence, the router port (or switch port) may be unnecessarily used to transmit non-relevant traffic to the router (or switch). Moreover, resources in the router (or switch) are wasted in reading and discarding the received data frames that are intended for the client and server.

SUMMARY OF THE INVENTION

There is a need for an arrangement for interconnecting network nodes using a buffered distributor, where traffic to a predetermined network node can be limited based upon the destination address of data frames received by the buffered distributor.

There is also a need for an arrangement in a workgroup environment that prevents client-server traffic from being unnecessarily transmitted to different network nodes, such as a switch or a router.

There is also a need for an arrangement in a buffered distributor that avoids unnecessary transmission of data packets to a predetermined network node to prevent discarding of frames at the predetermined network node.

These and other needs are attained by the present invention, where a buffered distributor includes a filter that selectively supplies a received data packet to a predetermined network node based on the destination address of the received data packet and the network address of the predetermined network node.

According to one aspect of the present invention, a buffered distributor comprises a plurality of network ports serving respective network nodes, each network port comprising a receive buffer for storing a first data packet received from the corresponding network node and a transmit buffer for storing a second data packet to be transmitted to the corresponding network node, and a distribution core comprising a filter for selectively supplying the first data packet received from the corresponding network port to a selected one of the remaining network ports based on a destination address of the first data packet and a network address of the network node corresponding to the selected one network port. The selective supply of the first data packet to the network port corresponding to the selected network port based on the destination address and the network address of the network node ensures that the buffered distributor does not output non-relevant data to the selected network node. Hence, a buffered distributor may be used in a workgroup environment, without burdening router or switch resources with client-server traffic.

Another aspect of the present invention provides a method in a buffered distributor comprising storing a network address of a predetermined network node, receiving a received data packet on one of a plurality of network ports in the buffered distributor, determining a destination address of the received data packet, and selectively transmitting the received data packet to the predetermined network node from the corresponding network port based on the destination address relative to the stored network address. The selective transmission to the predetermined network node minimizes non-relevant traffic to the predetermined network node in order to prevent wasting resources at that predetermined network node. Hence, the buffered distributor can be used to transmit data packets between network nodes, where selective transmission is performed on the network port corresponding to the predetermined network node to avoid unnecessary data traffic.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
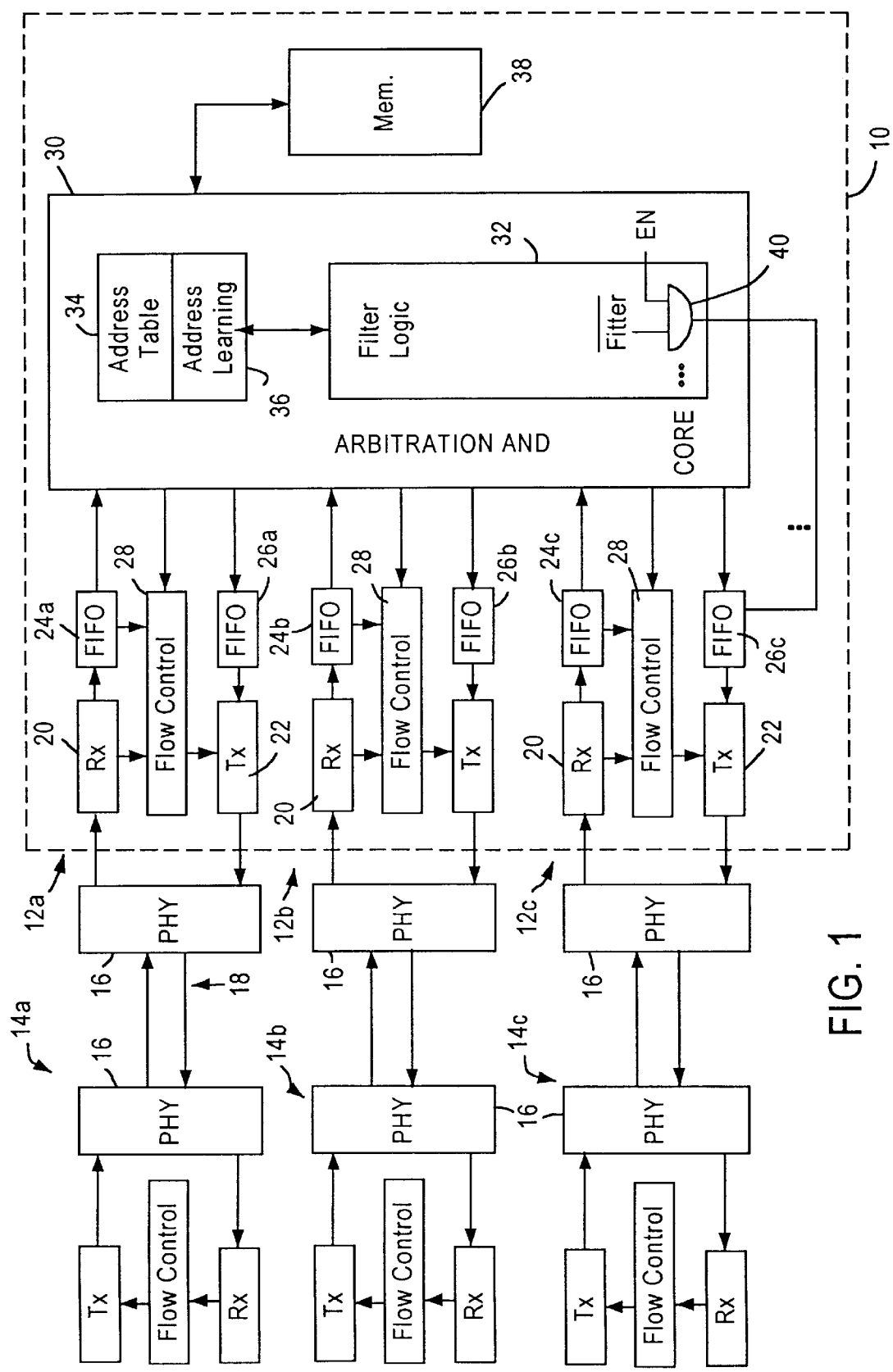
FIG. 1 is a block diagram of a buffered distributor serving network nodes according to an embodiment of the present invention.

FIG. 1 is a block diagram illustrating operation of a buffered distributor in a full-duplex packet switched network according to an embodiment of the present invention. The buffered distributor 10 includes a plurality of network ports 12, each configured for sending and receiving IEEE 802.3 data packets to and from respective network stations 14 according to IEEE 802.3x full-duplex protocol. According to the disclosed embodiment, the network node 14c is a predetermined node (e.g., router or switch) where it is desirable to limit non-relevant network traffic, as described below. Each of the network nodes 14 and network ports 12 includes a physical layer transceiver (PHY) 16 that sends and receives data symbols across a media 18 according to full-duplex protocol. The PHY transceiver 16 may be implemented as a discrete component, or may be integrated on-chip with the corresponding network node 14 or network port 12. The network nodes 14 and the buffered distributor 10 also include a media access control (MAC) layer receiver 20, a MAC layer transmitter 22, a receive FIFO buffer 24, and a transmit FIFO buffer 26. Each of the network nodes 14 and each of the network ports 12 also includes a flow control generator 28 configured for generating a flow control frame according to IEEE 802.3x protocol.

The buffered distributor 10 also includes a distribution core 30 configured for distributing data packets from the receive FIFO buffers 24 from each network port 12 to the transmit FIFO buffers 26 of the remaining network ports according to a prescribed output logic, described below. The distribution core 30 is preferably configured to access the receive buffers 24 of each network port 12 according to a round-robin sequence. Use of round-robin sequence as the arbitration technique for the distribution core 30 provides a more efficient distribution of data packets from the receive buffers 24, resulting in minimal wasted bandwidth compared to CSMA/CD logic.

The distribution core 30 includes filter logic 32 that selectively generates a filter signal to a selected network port to prevent outputting of a data frame supplied by the distribution core 30 to the corresponding network node. The filter logic 32 includes a block circuit, for example an AND gate 40 for each port 12, that selectively blocks the distribution of a data packet to a selected network port based on a corresponding filter signal. The distribution core 30 also includes an address table 34 for storing the network addresses of the network nodes 14. These addresses may be programmed into the address table 34 by a network administrator, or may be learned by the address learning logic in response to detecting a new source address in a received data packet. According to the disclosed embodiment, it is desirable to separate end-station addresses from the server entries in order to perform address aging on the end-station addresses to reduce the size of the end-station address table.

The repeater 10 also includes a distribution core memory 38 configured for storing the received data packet during a comparison by the filter logic 32 between the destination address of the received data packet and the network addresses stored in the address table 34.

Although shown in FIG. 1 only for transmit buffer 26c, each of the transmit buffers 26 receive an enable signal from the arbitration core 30. Assuming a network port is not assigned to a predetermined network node such as a router or a switch, the corresponding filter signal by the filter logic 32 is set to a high level, such that loading of a distributed data packet is controlled merely by an enable signal (EN) according to conventional logic.

Figure 2:
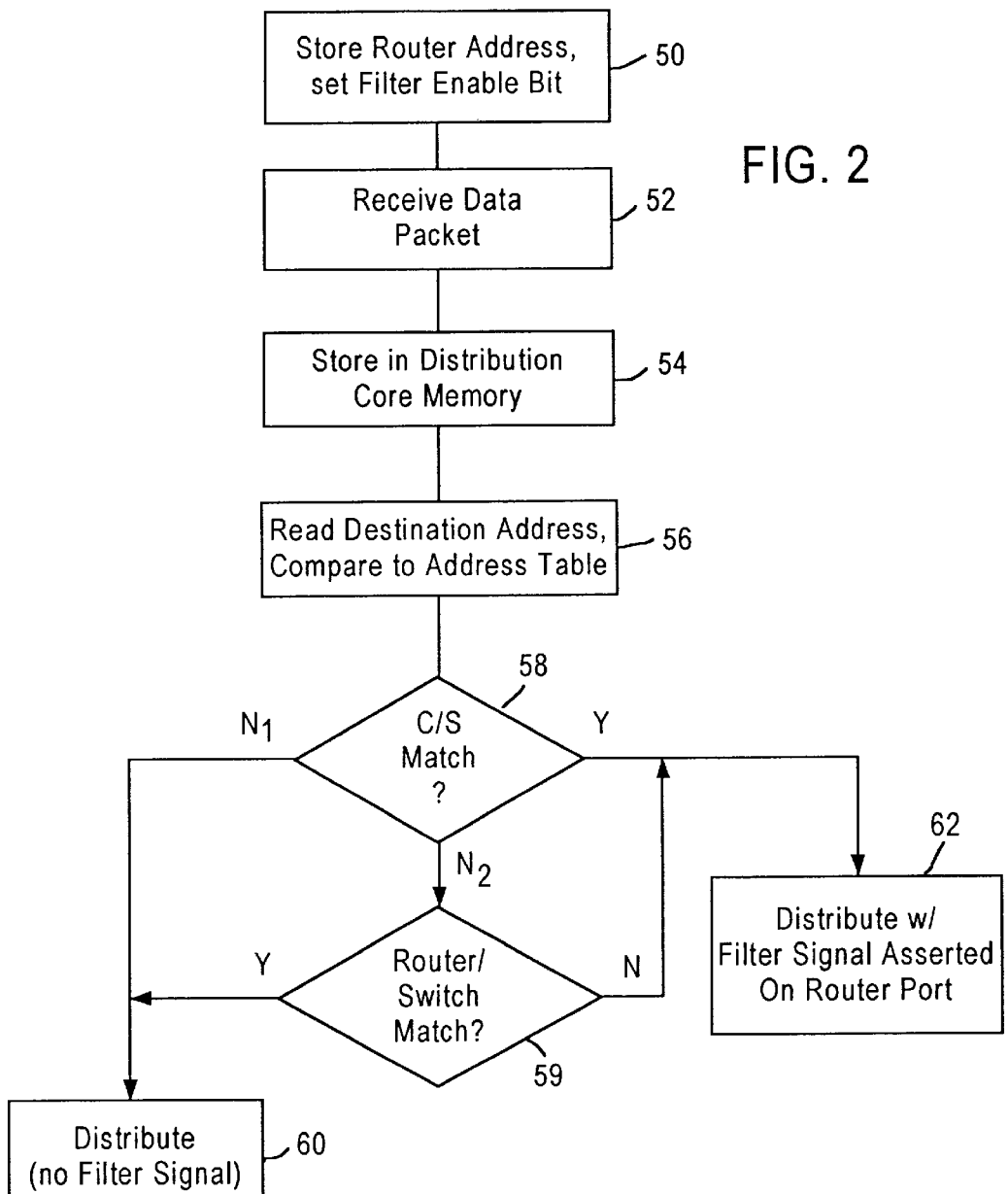
FIG. 2 is a diagram illustrating a method for selectively transmitting a data packet in a buffered distributor to a predetermined network node according to an embodiment of the present invention.
Figure 3:
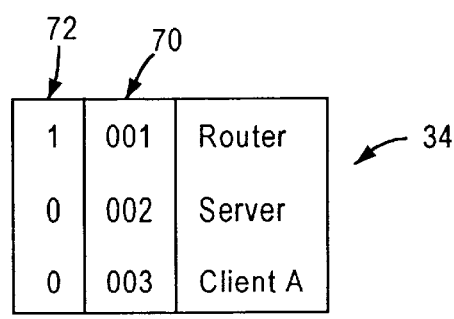
FIG. 3 is a diagram illustrating the address table of FIG. 1.

FIG. 2 is a flow diagram illustrating the method for distributing a received data packet in the buffered distributor according to an embodiment of the present invention. As shown in FIG. 2, the network address of the predetermined network node (e.g., a router or a switch) is stored in the address table 34 and the corresponding filter enable bit is set in step 50. As shown in FIG. 3, the address table 34 includes the network address 70 of the network node and a filter enable bit 72 that serves as a flag for the filter logic 32 whether filtering on the corresponding network port is necessary. Hence, the filter logic 32 performs the filtering function, described below, in response to the setting of the corresponding filter enable bit 72.

Once the address table 34 has been loaded with at least the network addresses of the predetermined network node 14c requiring filtering, normal repeater operations begin, including receiving a data packet from one of the network nodes in step 52, and storing the received data packet from the corresponding receive FIFO 24a to the distribution core memory 38 in step 54. Storage of the received data packet in the distribution core memory 38 is optional, but at the same time it is beneficial during the filter comparison by the filter logic 32.

The filter logic 32 reads the destination address of the received data packet in the distribution core memory 38, and searches the address table 34 and correlates the destination address with the contents of the address table in step 56. According to the disclosed embodiment, when a client station (e.g., network node 14a) sends a data packet to a server (e.g., node 14b), if the destination address of the transmitted data packet matches the address in the server address table, then the filter logic 32 will generate a filter signal (negative logic) to ensure that the data frame distributed by the distribution core is not loaded into the corresponding transmit buffer 26c serving the router port 12c. If there is a match between the destination address and either an identified client node or server node in step 58, then the data packet is distributed to all network ports 12 with a filter signal asserted on the blocking circuit 40 in step 62, causing the transmit FIFO 26c to not load the distributed data packet due to the lack of enable signal.

However, if in step 58 there is no match between the destination address and a client or server node, then the data packet is distributed with no filter signal asserted by the filter logic 32 on the router port 12c in step 60, causing the FIFO 26c to load the distributed data packet in response to an enable signal via condition $N_1$.

The method may include an optional comparison following the comparison between the destination address of the received data packet and the client and server address tables following step 58, shown as condition $N_2$. Specifically, an actual comparison may be made with the network address of the predetermined network node 14c and the destination address in step 59. If there is a match between the predetermined network node 14c and the destination address in step 59, then the data packet is distributed to all network ports 12 with no filter signal asserted on the blocking circuit 40 in step 60, causing the transmit FIFO 26c to load the distributed data packet in response to the enable signal. If in step 59, however, there is no match between the destination address and the predetermined network node 16c (e.g., a router or a switch), then the data packet is distributed with the filter signal asserted by the filter logic 32 on the router port 12c (or switch port 12c) in step 62, such that no enable is supplied to the FIFO 26c during distribution of the data packet.

Thus, the filter logic 32 may be configured to compare the destination address with a list of server addresses, such that a match between the destination address and the server address table results in the filter logic preventing loading of the distributed data frame into the transmit buffer 26c. Similarly, the filter logic 32 may be configured to serve an end-station table, such that if a match is found between a destination address and an entry in the end-station table, then the filter logic 32 prevents loading of the distributed frame by the transmit buffer 26c.

Hence, data packets may be selectively transmitted to a predetermined network port based on the destination address of the received data packet, alleviating the predetermined network node (i.e., the router or the switch) from processing unnecessary traffic, especially since processing in a router may be relatively slow and expensive.

According to the disclosed embodiment, data traffic is selectively transmitted to a predetermined network node in a buffered distributor to minimize processing in the predetermined network node, such as a router or a switch. The buffered distributor selectively transmits the data packet based on the destination address in the received data packet and relative to address entries in an address table. It will be appreciated that the comparison may be based upon a positive comparison relative to an address table of client stations, or servers, or a negative comparison relative to the actual predetermined network node.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A buffered distributor, comprising:
   a plurality of network ports serving respective network nodes, each network port comprising a receive buffer for storing a first data packet received from the corresponding network node and a transmit buffer for storing a second data packet to be transmitted to the corresponding network node; and
   a distribution core for distributing the first data packet to all of the network ports except the network port that received the first data packet and a network port corresponding to a selected network node, the distribution core comprising a filter for selectively supplying the first data packet received from the corresponding network port to the selected one of the remaining network ports based on a destination address of the first data packet and a network address of the network node corresponding to the selected one network port.

2. The buffered distributor of claim 1, wherein the distribution core comprises an address table storing a plurality of the network addresses for the respective network nodes, the filter outputting a filter pass signal to the selected one network port in response to a detected correlation between the destination address of the first data packet and the network address of the network node.

3. The buffered distributor of claim 2, wherein the transmit buffer corresponding to the selected one network port stores the first data packet based on the filter pass signal.

4. The buffered distributor of claim 2, wherein the distribution core simultaneously distributes the first data packet for reception by the network ports, the filter comprising a blocking circuit that selectively blocks the distribution of the first data packet to the selected one network port based on the filter pass signal.

5. The buffered distributor of claim 2, wherein the distribution core further comprises address learning logic for storing a new network address in the address table based upon detection of a new source address in the first data packet.

6. The buffered distributor of claim 5, further comprising a distribution core memory configured for storing the first data packet during a comparison between the destination address of the first data packet and the network addresses stored in the address table.

7. The buffered distributor of claim 2, wherein the address table further stores a filter enable bit for each of the stored network addresses, the filter selectively supplying the first data packet to each of the network ports based on setting of the corresponding filter enable bit.

8. The buffered distributor of claim 2, wherein the filter operates a filter reject signal to the selected one network port in response to a detected correlation between the destination of the first data packet and a network address of a second network node.

9. The buffered distributor of claim 8, wherein the network node is one of a switch and router, and the second network node is one of a client and server.

10. A buffered distributor, comprising:
    a plurality of network ports serving respective network nodes, each network port comprising a transmit buffer configured for storing a data packet to be transmitted to the corresponding network node, and loading logic for selectively causing the transmit buffer to store the data packet based on an enable signal and a filter signal; and
    a distribution core for distributing a received data packet from one of the network ports to the remaining network ports, the distribution core comprising filter logic for selectively generating the filter signal to a corresponding selected one of the remaining network ports based on a destination address of the received data packet and a network address of the network node corresponding to the selected one network port.

11. The buffered distributor of claim 10, wherein the distribution core comprises an address table storing a plurality of the network addresses for the respective network nodes, the filter logic outputting the filter signal to the selected one network port in response to a detected correlation between the destination address of the received data packet and the network address of the network node.

12. The buffer distributor of claim 11, wherein the distribution core further comprises address learning logic for storing a new network address in the address table based upon detection of a new source address in the received data packet.

13. The buffered distributor of claim 12, further comprising a distribution core memory configured for storing the received data packet during a comparison between the destination address of the received data packet and the network addresses stored in the address table.

14. The buffered distributor of claim 12, wherein the address table is configured for storing a filter enable bit for each of the stored network addresses, the filter logic performing the correlation detection for a stored network address in response to setting of the corresponding filter enable bit.

15. A method in a full-duplex buffered distributor comprising:

storing a network address of a predetermined network node;

receiving a received data packet on one of a plurality of network ports in the buffered distributor;

determining a destination address of the received data packet; and selectively transmitting the received data packet to the predetermined network node from the corresponding network port based on the destination address relative to the stored address, wherein the selectively transmitting step further comprises:

distributing the received data packet by a distribution core to all of the network ports except the network port that received the data packet and the network port corresponding to the predetermined network node;

determining a correlation between the destination network address and the stored network address;

selectively generating an enable signal to the network port corresponding to the predetermined network node based on said correlation; and storing the distributed received data packet into a transmit buffer of the network port corresponding to the predetermined network node in response to the enable signal.

16. The method of claim 15, wherein the storing step comprises:

loading the network address into an address table in the buffered distributor; and setting a filter bit associated with the network address indicating selective transmission to the predetermined network node, the selectively generating step comprising preventing generating of the enable signal to the network port corresponding to the predetermined network node if the corresponding filter bit is set and the determining step determines an absence of said correlation.

17. The method of claim 15, further comprising storing the received data packet in a distribution memory during the determining of a destination address of the received data packet step.

18. A method in a full-duplex buffered distributor comprising:

storing a network address of a predetermined network node;

receiving a received data packet on one of a plurality of network ports in the buffered distributor;

determining a destination address of the received data packet; and selectively transmitting the received data packet to the predetermined network node from the corresponding network port based on the destination address relative to the stored address, wherein the selectively transmitting step further comprises:

distributing the received data packet by a distribution core to all of the network ports except the network port that received the received data packet and the network port corresponding to the predetermined network node;

determining an absence of a correlation between the destination network address and a network address of one of a client and a server;

selectively generating an enable signal to the network port corresponding to the predetermined network node based on the determined absence of correlation; and storing the distributed received data packet into a transmit buffer of the network port corresponding to the predetermined network node in response to the enable signal.

* * * * *